May 7, 1929.                J. R. OISHEI                1,712,160
AUTOMATIC WINDSHIELD CLEANER
Filed June 15, 1926
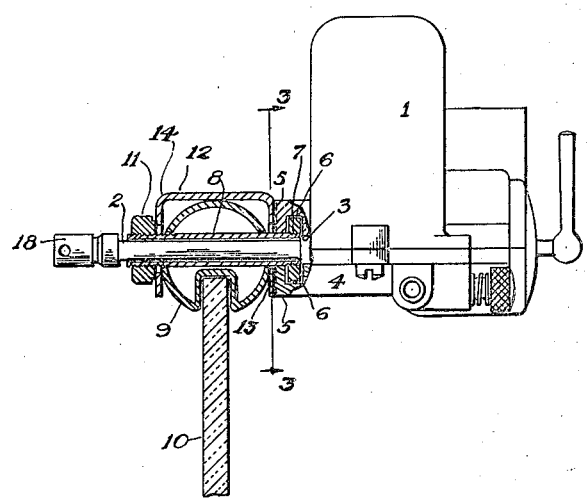
Fig. 1
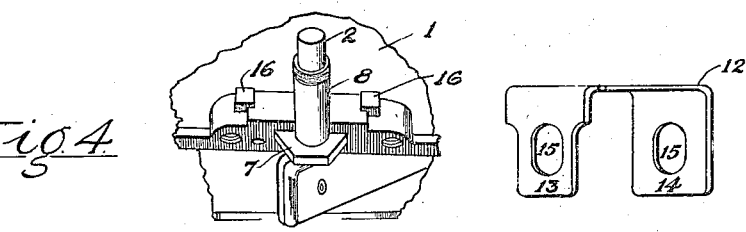
Fig. 4
Fig. 5
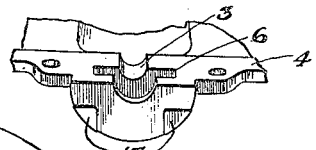
Fig. 2
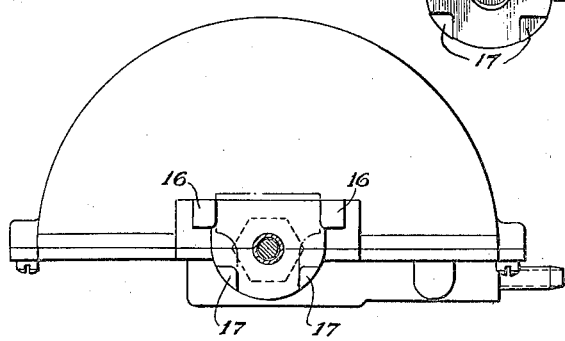
Fig. 3
John A. Oishei, Inventor
by Barton A. Beau, Atty.

Patented May 7, 1929.

1,712,160

UNITED STATES PATENT OFFICE.

JOHN R. OISHEI, OF BUFFALO, NEW YORK, ASSIGNOR TO TRICO PRODUCTS CORPORATION, OF BUFFALO, NEW YORK.

AUTOMATIC WINDSHIELD CLEANER.

Application filed June 15, 1926. Serial No. 116,140.

This invention relates to windshield cleaners of the automatic type in which a motor, either of the fluid pressure type or the electrical type, is employed to actuate and move a wiper over the glass of the windshield, and it has special reference to the mounting of the cleaner on the windshield frame.

Heretofore, in the mounting of the windshield cleaners special brackets have been required for attaching and supporting the motor on the windshield frame, or, in the absence of any special bracket formation, the motor has been attached directly to the windshield frame by two or more screws or bolts arranged on opposite sides of the wiper operating shaft. This latter practice has necessitated the drilling of at least three holes through the windshield frame, the central hole being provided for the wiper shaft and the lateral openings being adapted to receive the attaching screws. Aside from the additional labor required in drilling these three holes, special attention must be given to their spacing, for if they are improperly spaced the shaft will be caused to bind where it passes through the windshield frame, with the resultant injurious effects both on the shaft and the motor.

The object of this invention is to provide a single hole or one-hole mounting for the cleaner motor, comprising a sleeve attached to the motor casing and inclosing the wiper shaft where it passes through the windshield frame, which mounting construction necessitates the drilling of only one hole through the windshield frame.

A further object is to provide a novel manner of connecting the mounting sleeve to the motor casing for facilitating such assembly, and also a cooperative means interlockable with the motor casing or housing for holding the latter against turning relative to the windshield.

The invention resides in the assembly of the mounting sleeve relative to the motor casing; in the construction and mounting of the bracket or clamp member and its association with the motor casing; and also in the arrangements and combinations of the mounting parts, as described in detail in the following description and set forth in the appended claims, reference being had to the accompanying drawings, wherein:

Fig. 1 is a view partly in section and partly in elevation depicting the novel mounting of the windshield cleaner motor on the windshield, the latter being shown in fragment;

Fig. 2 is a detailed perspective view of the bracket or clamp member;

Fig. 3 is a section on line 3—3 of Fig. 1 with the bracket or clamp member being shown by dot and dash lines;

Fig. 4 is a detail perspective view illustrating more clearly the attachment of the mounting sleeve to the motor casing; and Fig. 5 is a similar view of the cover plate showing the sleeve anchor pocket.

Referring more in detail to the accompanying drawings, the windshield cleaner motor, for the purpose of illustration, has been depicted as being of the fluid pressure or suction operated type in which a piston or vane is oscillated by the alternate applications of operating pressure to the opposite sides of said piston or vane, the latter being mounted on the wiper operating shaft 2, which is journaled in a composite bearing 3 formed in the body portion 1 and its cover plate 4 of the motor casing. The body portion or housing 1 and the plate 4 are provided with lateral enlargements 5 formed with complemental pockets or recesses 6, into which the anchor block 7 is dropped or inserted before the cover plate 4 is secured to the casing. This anchor may be of any suitable shape and size, and is here shown in the form of a hexagonal nut with a threaded central opening to receive the threaded inner end of a mounting sleeve 8.

The top frame bar 9 of the windshield 10 is provided with a single hole extending therethrough, and through this hole is passed the mounting sleeve 8 with its enclosed wiper operating shaft 2, the sleeve being of such length as to project from the opposite side of the frame bar and such projecting end is threaded to receive a securing nut 11.

Means are provided for preventing the cleaner motor from jarring out of position, such means being in the form of a bracket or clamp member, which is preferably struck up from sheet metal into a substantially inverted U-form to provide a stop portion 12 and spaced leg or jaw portions 13 and 14 which straddle the frame bar 9 and are provided with elongated openings 15 through which the mounting sleeve extends. The stop portion 12 is adapted to normally rest on the upper face of the frame bar 9 with one straddling portion 13 interposed between the motor and frame bar 9 at one side of the windshield and the other straddling portion 14 interposed between the nut 11 and frame bar at the opposite side of the windshield, the elongated openings 15 permitting adjustment and variations in the style of the windshield frame bar 9. The enlargement 5 of the motor casing is provided with a pair of spaced shoulders 16 and the corresponding enlargement of the cover plate is formed with a pair of spaced shoulders 17 and between the shoulders of each pair is designed to fit the inner straddling portion 13 to effect an interlock between the motor casing and the bracket member. In actual practice, the enlargement 5 of the cover plate is comparatively smaller across its face than that of the housing 1, and therefore the shoulders 17 are arranged closer together than shoulders 16. Consequently, the inner straddling portion 13 has its lower end reduced in width so as to be received between the shoulders 17. This construction provides an interlock between the bracket or clamp member and the cleaner motor for securing the latter against turning relative to said bracket member. In practice, the sleeve is attached to the motor at the time of its assembly in the factory, the anchor 7 being disposed in one pocket or recess 5 prior to securing the cover plate to the body portion 1.

In mounting the cleaner motor on the windshield, the bracket member is first seated on the frame bar 9 with its openings 15 registering with the opening through said frame bar. The sleeve is now inserted through the registering openings, and the nut 11 applied to the projecting end of said sleeve to tightly press against the outer straddling portion 14 for firmly clamping both jaws or straddling portions against the opposite side of frame bar 9. The operating shaft 2 projects beyond the outer end of sleeve 8 and is provided with an enlarged head 18 to which the wiper arm (not shown) is attached. This head 18 extends in proximity to the outer end of sleeve 8 and thereby prevents the latter from becoming displaced or unthreaded from the anchor, which latter may be permanently attached to or be an integral part of the sleeve.

The inner straddling portion 13 serves to space the cleaner motor from the windshield frame bar whereby the motor casing is free from contact with the more or less distortable windshield frame. Further, the motor housing is free from projecting lugs to engage the frame bar, the sleeve with the bracket member and their associated parts constituting the sole means of connection between the cleaner motor and the windshield. Said inner straddling portion 13 is connected to the stop portion 12, and both coact to hold the motor housing from turning about on the sleeve, said stop portion engaging over the frame bar to interlock therewith for resisting any tendency of the housing to become displaced. The outer straddling portion 14, by its connection with the mounting sleeve, further strengthens the assembly and adds support to the motor.

What is claimed as new is:

1. In an automatic windshield cleaner, a motor casing having a protruding cleaner shaft, a mounting sleeve inclosing the shaft where the latter passes through the windshield frame and from which the shaft projects, an anchor block removably secured to the casing and to which block the adjacent end of the mounting sleeve is connected, and means engaged with the opposite end of the sleeve for being clamped against the side of the windshield frame remote from the casing for clampingly securing the cleaner to the windshield.

2. In an automatic windshield cleaner, a motor casing having a removable part, said casing and removable part each having complemental shaft bearings and enlarged communicating recesses, a cleaner shaft journaled in the composite bearings and projecting from the casing, an anchor member through which the shaft extends, disposed within the composite recess and being removable therefrom upon first displacing said removable part, a shaft-inclosing sleeve threaded at one end into the anchor member and designed for being passed through an opening in the windshield frame for mounting the casing on the windshield, and a clamping nut threaded on the opposite end of the sleeve for being engaged with the adjacent side of the windshield.

3. In an automatic windshield cleaner, a motor casing having an anchor-receiving recess, a shaft journaled in the casing and projecting therefrom, a mounting sleeve surrounding the shaft and having an anchoring enlargement on its inner end engaged in said recess against axial displacement, and a securing member on the outer end of the sleeve for cooperating with the casing in exerting clamping pressure against the interposed windshield frame.

4. In an automatic windshield cleaner, a motor comprising a casing and a wiper shaft projecting therefrom, said casing having an anchor-receiving recess, a mounting sleeve surrounding the projecting shaft and held against endwise displacement therefrom, an anchor member removably engaged in said casing recess and with which the inner end of said sleeve is detachably secured, means releasably holding the anchor member against displacement from said casing recess, and a securing member engaged with the outer end of said sleeve.

5. In an automatic windshield cleaner, a motor comprising a casing having a projecting wiper shaft, a mounting sleeve surrounding the shaft and secured to the casing, a clamp member for seating on the windshield frame in straddling relation thereto and through which the sleeve and shaft extend, said clamp member being connected to the casing against free relative turning, and a securing member on the outer end of the sleeve for forcing the clamp member into clamping relation to the windshield frame.

6. In an automatic windshield cleaner, a motor casing having a shaft projecting therefrom, a sleeve about said shaft and projecting from the casing, a U-shaped clamp member for straddling the frame of a windshield, the inner leg portion interlocking with means formed on the motor casing to hold the same from turning away from its normal position, said sleeve extending through the leg portions of said clamp member and adapted to extend through an opening in the windshield frame portion between said leg portions, and means on the outer end of said sleeve for binding against the outer leg portion of said clamp member to bring both leg portions thereof into clamping relation to the windshield frame.

7. In an automatic windshield cleaner, a motor casing having a shaft projecting therefrom and spaced shoulders exteriorly arranged, a windshield frame clamp member having inner and outer leg portions for straddling a windshield frame, the inner leg portion interengaging with the casing shoulders to secure the casing against movement relative to the clamp member, a mounting sleeve through which the shaft extends, anchored at its inner end to the casing and adapted to be passed through an opening in the windshield frame, said clamp member being connected to said sleeve against dislodgment, and means on the outer end of the sleeve for clamping the outer leg portion against the windshield frame.

8. A mounting for automatic windshield cleaners, comprising, in combination, a cleaner motor casing having a projecting shaft, a sleeve through which the shaft extends, secured at its inner end to the casing and adapted to be passed through an opening in the windshield frame with its forward end projecting therefrom, a bracket member detachably interlocked with the casing and overlapping a portion of the windshield frame for holding the casing against turning relative thereto, and means on the outer end of said sleeve for securing the casing to the windshield, said means with the sleeve and bracket constituting the whole mounting for the casing.

9. In an automatic windshield cleaner, a motor casing having a projecting shaft, a mounting sleeve through which the shaft extends, secured at its inner end to the casing and adapted to be passed through an opening in the windshield frame with its outer end projecting therefrom, means on the outer end of the sleeve for securing the casing to the windshield frame, and a member interposed between the windshield frame and casing and interlocked with the latter, said member spacing the casing from the frame and having a part interlocking with said frame to hold the casing from turning relative to said frame.

10. In an automatic windshield cleaner having a wiper operating shaft, a casing formed of complemental sections having complemental recesses in their abutting faces, an anchor arranged in the recesses, and a mounting sleeve carried by the anchor and projecting from the motor casing, said shaft extending through said sleeve.

JOHN R. OISHEI.